United States Patent
Kwon et al.

(10) Patent No.: US 9,443,138 B2
(45) Date of Patent: Sep. 13, 2016

(54) APPARATUS AND METHOD FOR RECOGNIZING HAND SHAPE USING FINGER PATTERN

(71) Applicant: Samsung Electronics Co., Ltd., Gyeonggi-do (KR)

(72) Inventors: Mu-Sik Kwon, Seoul (KR); Moo-Rim Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 320 days.

(21) Appl. No.: 13/851,619

(22) Filed: Mar. 27, 2013

(65) Prior Publication Data

US 2013/0259384 A1    Oct. 3, 2013

(30) Foreign Application Priority Data

Mar. 28, 2012  (KR) .................. 10-2012-0031866

(51) Int. Cl.
*G06K 9/48*    (2006.01)
*G06K 9/00*    (2006.01)

(52) U.S. Cl.
CPC .................. *G06K 9/00375* (2013.01)

(58) Field of Classification Search
CPC .................................. G06K 9/00375
See application file for complete search history.

(56) References Cited

U.S. PATENT DOCUMENTS

| | | |
|---|---|---|
| 5,594,469 A | 1/1997 | Freeman et al. |
| 6,043,805 A * | 3/2000 | Hsieh ............... G06F 3/0425 345/158 |
| 6,819,782 B1 * | 11/2004 | Imagawa et al. ............ 382/115 |
| 2002/0090146 A1 * | 7/2002 | Heger et al. ................. 382/291 |
| 2004/0017934 A1 * | 1/2004 | Kocher ........................ 382/125 |
| 2005/0271279 A1 * | 12/2005 | Fujimura et al. ............ 382/203 |
| 2008/0240514 A1 * | 10/2008 | Zhang et al. ................ 382/115 |
| 2008/0273755 A1 | 11/2008 | Hildreth |
| 2009/0110292 A1 * | 4/2009 | Fujimura et al. ............ 382/203 |
| 2009/0322673 A1 * | 12/2009 | Cherradi El Fadili ....... 345/157 |
| 2010/0098299 A1 * | 4/2010 | Muquit et al. ............... 382/115 |
| 2010/0202693 A1 * | 8/2010 | Song et al. ................... 382/190 |
| 2012/0051605 A1 * | 3/2012 | Nagar et al. ................. 382/124 |
| 2012/0087543 A1 * | 4/2012 | Choi .................. G06K 9/00382 382/103 |

FOREIGN PATENT DOCUMENTS

JP    3491189    1/2004

OTHER PUBLICATIONS

Michiyo Moriya et al., "Device for Detecting Hand State"; English translation of JP3491189; Publication date Jan. 29, 1999 pp. 1-30.*

* cited by examiner

*Primary Examiner* — Samir Ahmed
(74) *Attorney, Agent, or Firm* — The Farrell Law Firm, P.C.

(57) ABSTRACT

An apparatus and a method for recognizing a hand shape by using a finger pattern are disclosed. The throughput of data used to recognize a hand shape is reduced and the hand shape can be quickly recognized by setting in advance a finger pattern in accordance with one or more hand shapes, calculating edges for each pixel line of an input image, detecting finger feature data by using a preset feature reference value, detecting a finger candidate pattern by using the detected finger feature data, and recognizing a hand shape corresponding to a finger pattern that matches the detected finger candidate pattern.

12 Claims, 5 Drawing Sheets

APPARATUS AND METHOD FOR RECOGNIZING HAND SHAPE USING FINGER PATTERN

PRIORITY

This application claims priority under 35 U.S.C. §119(a) to Korean Application Serial No. 10-2012-0031866, which was filed in the Korean Intellectual Property Office on Mar. 28, 2012, the entire content of which is incorporated herein by reference.

BACKGROUND OF THE INVENTION

1. Field of the Invention

The present invention relates generally to a recognition apparatus and method, and more particularly, to an apparatus and a method for recognizing a hand shape by using a preset finger pattern according to the hand shape.

2. Description of the Related Art

A general method of recognizing a hand shape detects, when an image is input, a plurality of edges within an image corresponding to areas having a preset size on the image. The method determines direction information on each of the detected edges, and then calculates a histogram of the determined direction information.

For example, when the edges of the image areas within the image are detected, the detected edge direction is determined and the number of edges having the determined edge direction is also determined, thereby generating the histogram. When the histogram for each area of the input image is completely generated, a histogram value corresponding to each area is compared with a preset reference histogram value to detect the hand shape. According to a result of the comparison, it is determined whether there is a reference histogram value similar to the histogram value corresponding to each area, and a hand shape corresponding to the determined reference histogram value is output as a recognition result.

As described above, in the prior art, the edges are determined along the preset area from the input image, the histogram for the determined edge direction is generated, the generated histogram is compared with the preset reference histogram, and then the hand shape is recognized according to the comparison result.

However, since the histogram for the edge direction is generated for each area in the prior art, there is a disadvantage in that the data throughput is large and thus quick recognition of the hand shape in a portable terminal is difficult.

SUMMARY OF THE INVENTION

The present invention has been made to address the problems and disadvantages described above, and to provide at least the advantages described below. Accordingly, an aspect of the present invention provides an apparatus and a method for quickly recognizing a hand shape in a portable terminal by using a preset finger pattern in accordance with the hand shape.

In accordance with an aspect of the present invention, an apparatus for recognizing a hand shape by using a finger pattern is provided. The apparatus includes a memory for storing a preset finger pattern according to each hand shape in accordance with one or more hand shapes; and a controller for calculating edges for each pixel line within an input image, detecting finger feature data according to a preset feature reference value by using the calculated edges, detecting a finger candidate pattern by using the detected finger feature data, and outputting a hand shape corresponding to a finger pattern that matches the detected finger candidate pattern among finger patterns stored in the memory as a recognition result.

In accordance with another aspect of the present invention, a method of recognizing a hand shape by using a finger pattern in a hand shape recognition apparatus is provided. The method includes storing a preset finger pattern according to each hand shape in accordance with one or more hand shapes; calculating edges for respective pixel lines within an input image; detecting finger feature data according to a preset feature reference value by using the calculated edges; detecting a finger candidate pattern by using the detected finger feature data; and outputting a hand shape corresponding to a finger pattern that matches the detected finger candidate pattern among finger patterns stored in a memory as a recognition result.

BRIEF DESCRIPTION OF THE DRAWINGS

The above and other aspects, features and advantages of the present invention will become more apparent by describing in detail exemplary embodiments thereof with reference to the attached drawings in which.

DETAILED DESCRIPTION OF EMBODIMENTS OF THE PRESENT INVENTION

Hereinafter, various embodiments of the present invention will be described with reference to the accompanying drawings. In the following description of the present invention, a detailed description of known functions and configurations incorporated herein will be omitted when it may make the subject matter of the present invention unclear.

According to the present invention, it is possible to reduce the data throughput for hand shape recognition and quickly recognize a hand shape by setting in advance a finger pattern in accordance with one or more hand shapes, calculating edges for each pixel line of an input image, detecting finger feature data by using a preset feature reference value, detecting a finger candidate pattern by using the detected finger feature data, and recognizing a hand shape corresponding to a finger pattern that matches the detected finger candidate pattern.

Figure 1:
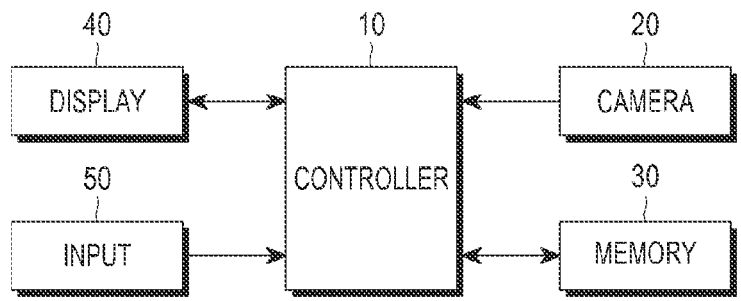
FIG. 1 is a block diagram of a hand shape recognition apparatus according to an embodiment of the present invention.

FIG. 1 is a block diagram of a hand shape recognition apparatus according to an embodiment of the present invention.

The hand shape recognition apparatus according to the present invention includes a controller 10, a camera 20, a memory 30, a display 40, and an input 50.

The controller 10 controls a general operation of the hand shape recognition apparatus, and in particular, calculates edges for each pixel line on the input image output from the camera 20 to recognize a hand shape. At this time, "pixel line" refers to a line including a plurality of pixels. Further, according to an embodiment of the present invention, information on a finger pattern used to recognize each hand shape is preset and stored in the memory 30 in accordance with one or more hand shapes to recognize the hand shape. For example, when the hand shape is provided in which the hand is opened, information on the finger pattern having a shape of "III" may be matched with the hand shape (FIG. 4) and then stored in the memory 30. In addition, when the hand shape indicating "OK", done by connecting a thumb and an index finger into a circle and holding the other three fingers straight, is provided (FIG. 5), information on a finger pattern having a triangle shape may be matched with the hand shape and then stored in the memory 30. Such a finger pattern may be set in other forms as well.

The controller 10 detects finger feature data according to a preset feature reference value. Specifically, the controller 10 detects a preset feature reference value, for example, pixel groups having similar pixel values between edges having similar lengths calculated for each pixel line, and sets the detected pixel groups as finger feature data. The feature reference value refers to a reference value for detecting pixel groups between edges having the same length and the same pixel value. Further, the pixel group includes pixels located between the detected edges. A reference that determines a similar length and a similar pixel value is described. When a difference value of lengths between edges is smaller than a preset threshold, it is determined to have the similar length. When a difference value of average pixel values of pixels between edges is smaller than a preset threshold, it is determined to have the similar pixel value. The controller 10 detects a finger candidate pattern by using the detected finger feature data. Specifically, the controller 10 determines a pixel line where no edge is detected for each line within a preset area based on the finger feature data on the input image. Thereafter, the controller 10 generates a vertical pixel line by vertically connecting a pixel line where no edge is detected within the area and a pixel line where the finger feature data exists.

The controller 10 detects the finger candidate pattern by using the detected finger feature data. Specifically, the controller 10 detects the pattern generated by connecting the generated vertical pixel line and the pixel line where no edge is detected as the finger candidate pattern.

The controller 10 detects a finger pattern that matches the detected finger candidate pattern among finger patterns stored in the memory 30, and outputs a hand shape corresponding to the detected finger pattern as a recognition result.

The camera 20 receives an optical signal and outputs image data.

The memory 30 stores general data used in the hand shape recognition apparatus, and in particular, stores information on the finger pattern used to recognize each hand shape in accordance with one or more hand shapes. Further, the controller 10 stores the recognition result output by the above recognition method.

The display 40 may be implemented by a Liquid Crystal Display (LCD). The display 40 visually provides a menu of the hand shape recognition apparatus, input data, function setting information, and other various information to a user, and in particular, displays a hand shape recognition result through the controller 10. The display 40 may also be implemented by various devices other than the LCD.

The input 50 includes a plurality of keys and outputs a key signal corresponding to a key input to the controller 10. Also, the input 50 may include a touch screen or a touch pad for detecting a touch input of the user and generating a detection signal to transmit the detection signal to the controller 10.

As described above, according to the present invention, the throughput of data used to recognize the hand shape is reduced, and the hand shape can be quickly recognized.

Figure 2:
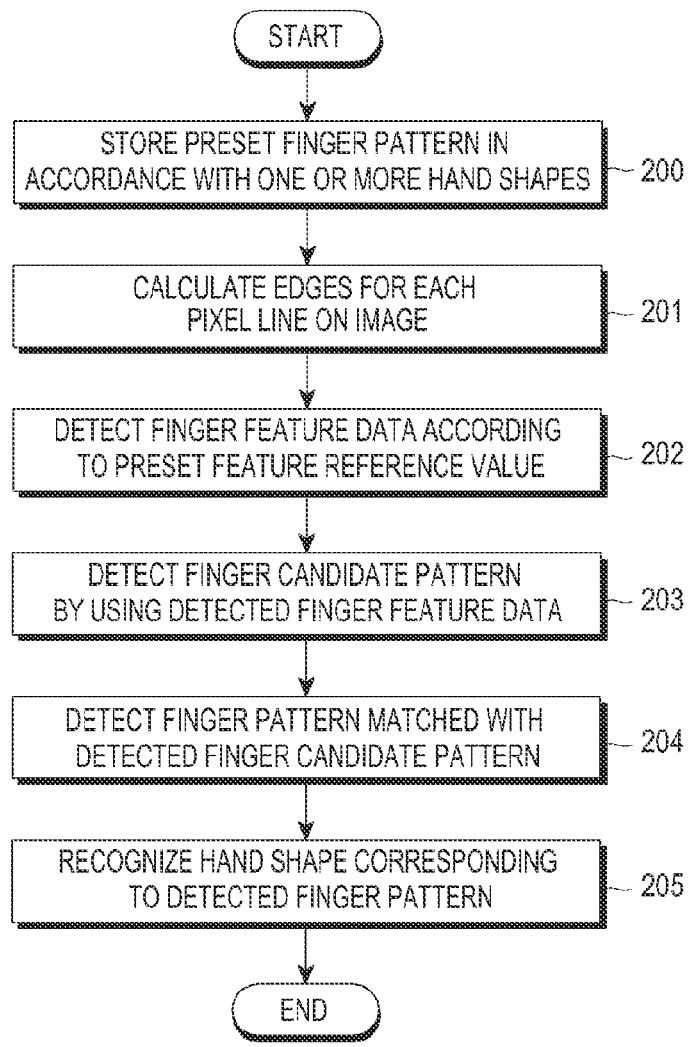
FIG. 2 is a flowchart illustrating a process in which a hand shape recognition apparatus recognizes a hand shape according to an embodiment of the present invention.

FIG. 2 is a flowchart illustrating a process in which the hand shape recognition apparatus recognizes a hand shape according to an embodiment of the present invention.

In step 200, the controller 10 stores in advance a preset finger pattern in accordance with one or more hand shapes in the memory 30, and in step 201, the controller 10 calculates edges for each pixel line on the image input through the camera 20.

In step 202, the controller 10 detects finger feature data according to a preset feature reference value. Specifically, the controller 10 detects a preset feature reference value, for example, pixel groups having similar pixel values between edges having similar lengths calculated for each pixel line, and sets the detected pixel groups as finger feature data.

In step 203, the controller 10 detects a finger candidate pattern by using the detected finger feature data. Specifically, the controller 10 determines a pixel line where no edge is detected for each line within a preset area based on the finger feature data on the input image. The controller 10 generates a vertical pixel line by vertically connecting a pixel line where no edge is detected within the area and a pixel line where the finger feature data exists. The controller 10 detects the pattern generated by connecting the generated vertical pixel line and the pixel line where no edge is detected as the finger candidate pattern.

In step 204, the controller 10 detects a finger pattern that matches the detected finger candidate pattern among finger patterns stored in the memory 30, and in step 205, the controller 10 outputs a hand shape corresponding to the detected finger pattern as a recognition result.

As described above, according to the present invention, the throughput of data used to recognize the hand shape is reduced, and the hand shape can be quickly recognized.

Figure 3:
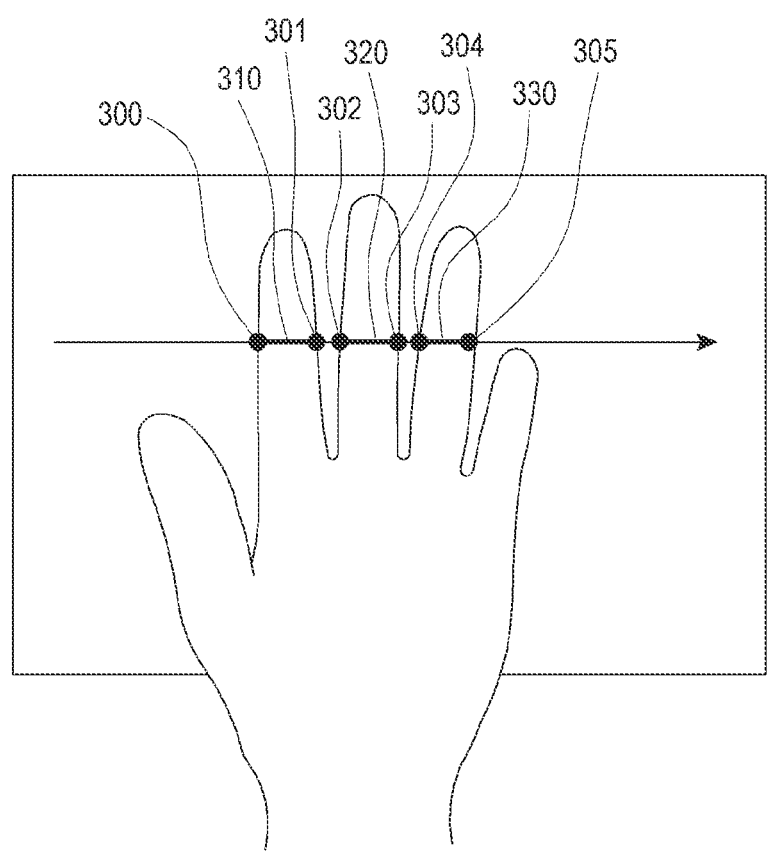
FIGS. 3 and 4 illustrate examples of a process of recognizing a hand shape according to a first embodiment of the present invention.
Figure 4:
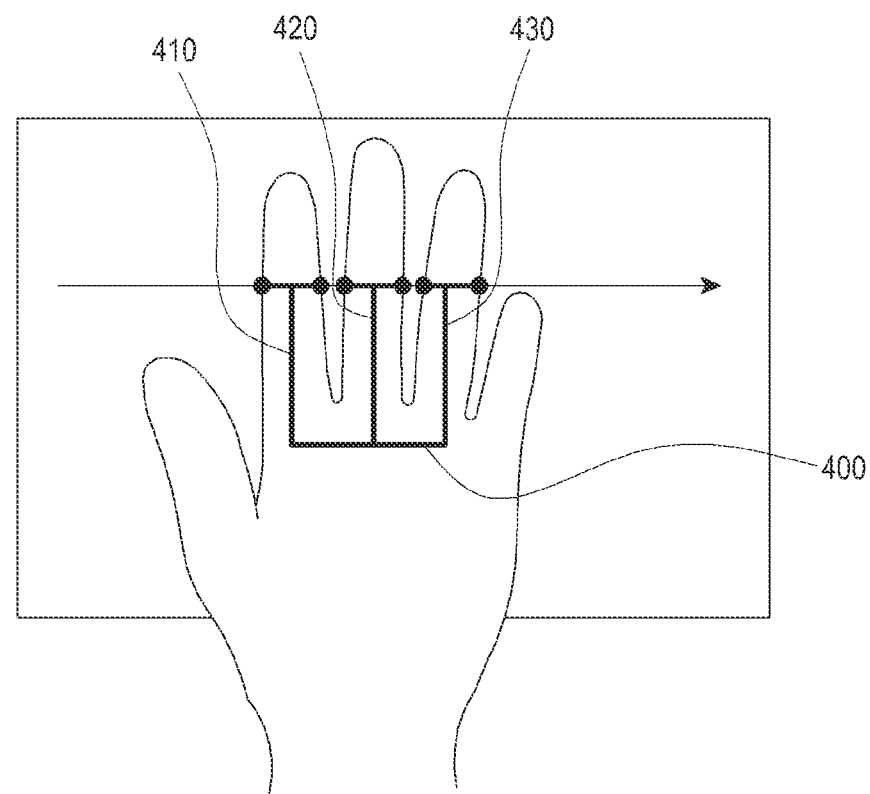

FIGS. 3 and 4 illustrate examples of a process of recognizing a hand shape in which the hand is opened according to a first embodiment of the present invention.

FIG. 3 illustrates a process of detecting finger feature data according to the first embodiment of the present invention. As illustrated in FIG. 3, when the controller 10 detects edges 300, 301, 302, 303, 304, and 305 while detecting the edges for each pixel line, the controller 10 compares a pixel group between the edges 300 and 301, a pixel group between the edges 301 and 302, a pixel group between the edges 302 and 303, a pixel group between the edges 303 and 304, and a pixel group between the edges 304 and 305. In other words, the controller 10 detects pixel groups having similar lengths and similar average pixel values by comparing lengths and average pixel values of the pixel groups. When the detected pixel groups correspond to pixel groups 310, 320, and 330, the controller 10 outputs the detected pixel groups 310, 320, and 330 as the finger feature data. In detecting the pixel groups, distinguishing between the pixel groups 310, 320, and 330 corresponding to the fingers, and pixel groups corresponding to background (or spaces) between the fingers, can be made by considering whether a difference between the average pixel value and a skin color is within a preset threshold. For example, after the pixel group 310 corresponding to an index finger is detected through the comparison with the threshold, the pixel groups 320 and 330 corresponding to a middle finger and a ring finger having similar lengths and similar average pixel values to those of the pixel group 310 corresponding to the index finger are detected.

FIG. 4 illustrates a process of detecting a finger candidate pattern by using finger feature data according to the first embodiment of the present invention.

While detecting the edges for each pixel line, the controller 10 determines a pixel line 400 where no edge is detected within an area having a preset size based on finger feature data. For example, the preset size may be a size between the edges 300 and 305 of FIG. 3.

The controller 10 generates a vertical pixel line from the detected pixel line 400 to the finger feature data, extending in a vertical direction. The generated vertical pixel lines are indicated by reference numerals 410, 420, and 430.

The controller 10 detects a finger candidate pattern generated by connecting the pixel line 400 and the three vertical pixel lines 410, 420, and 430. The detected finger candidate pattern is a pattern having a shape of "Ш", as shown in FIG. 4.

Thereafter, the controller 10 detects a finger pattern that matches the detected finger candidate pattern from the memory 30, and outputs a hand shape corresponding to the detected finger pattern as a recognition result.

As described above, according to the present invention, the throughput of data used to recognize the hand shape is reduced, and the hand shape can be quickly recognized.

Figure 5:
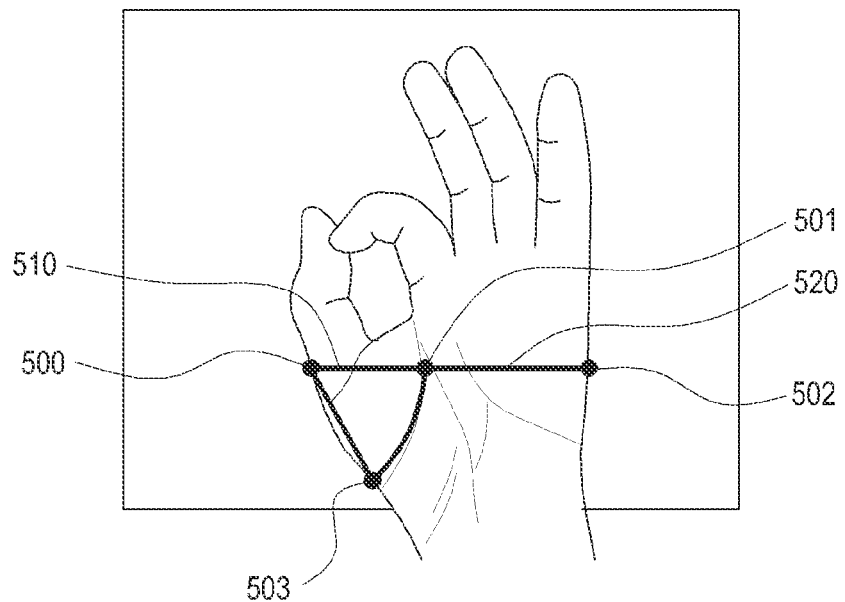
FIG. 5 illustrates an example of a process of recognizing a hand shape according to a second embodiment of the present invention.

FIG. 5 illustrates an example of a process of recognizing a hand shape according to a second embodiment of the present invention, in which recognizing a hand shape in which a circle is made by a thumb and an index finger and the remaining three fingers are opened is described with reference to FIG. 5.

While detecting edges for each pixel line, the controller 10 compares lengths of pixel groups between the detected edges and detects finger feature data according to a preset feature reference value. For example, the controller 10 detects adjacent pixel groups having a ratio of lengths therebetween, which is the same as a preset ratio, as the finger feature data. The controller 10 can also determine whether the adjacent pixel groups have similar average pixel values. Here, the preset feature reference value may be a preset ratio according to lengths of the pixel groups and a similar average pixel value. In other words, when a ratio between a length of a pixel group 510 between edges 500 and 501 and a length of a pixel group 520 between edges 501 and 502 is similar to the preset ratio and an average pixel value of the pixel group 510 is similar to an average pixel value of the pixel group 520, the controller 10 detects the pixel groups 510 and 520 as the finger feature data. Here, when a difference value between the preset ratio and the ratio of the lengths of the pixel groups is smaller than the preset threshold, the controller 10 determines that the pixel groups are similar.

The controller 10 detects a finger candidate pattern by using the detected finger feature data, and for example, detects an edge 503 located in an intersection where edges intersect each other according to lines of a palm generated in the circle made by the thumb and the index finger while continuously detecting the edges for each pixel line. Thereafter, the controller 10 detects a finger candidate pattern generated by connecting the edge 500 and the edge 501 corresponding to the finger candidate pattern and the detected edge 503. At this time, the detected finger candidate pattern has a triangular shape.

The controller 10 detects a finger pattern that matches the detected finger candidate pattern from the memory 30 and outputs a hand shape corresponding to the detected finger pattern as a recognition result.

As described above, according to the present invention, the throughput of data used to recognize the hand shape is reduced, and the hand shape can be quickly recognized.

Figure 6:
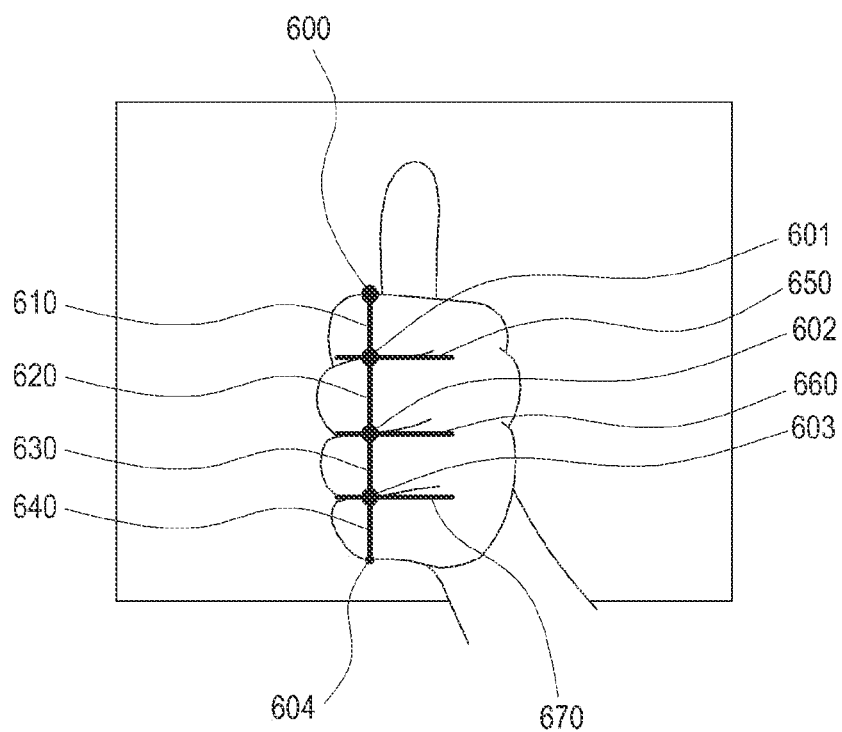
FIG. 6 illustrates an example of a process of recognizing a hand shape according to a third embodiment of the present invention.

FIG. 6 illustrates an example of a process of recognizing a hand shape achieved by a closed fist held with a thumb extended upward according to a third embodiment of the present invention.

When detecting edges 600, 601, 602, 603, and 604 in a vertical direction while detecting the edges for each pixel line, the controller 10 compares a pixel group between the edges 600 and 601, a pixel group between the edges 601 and 602, a pixel group between the edges 602 and 603, and a pixel group between the edges 603 and 604. In other words, the controller 10 detects pixel groups having similar lengths and similar average pixel values by comparing lengths and average pixel values of the pixel groups. When the detected pixel groups correspond to pixel groups 610, 620, 630, and 640, the controller 10 outputs the detected pixel groups 610, 620, 630, and 640 as the finger feature data.

Thereafter, the controller 10 detects edge directions 650, 660, and 670 of the edges 601, 602, and 603 as the finger candidate pattern based on the finger feature data. At this time, the detected finger candidate pattern has a shape of "≡".

The controller 10 detects a finger pattern that matches the detected finger candidate pattern from the memory 30 and outputs a hand shape corresponding to the detected finger pattern as a recognition result.

As described above, according to the present invention, the throughput of data used to recognize the hand shape is reduced, and the hand shape can be quickly recognized.

Figure 7:
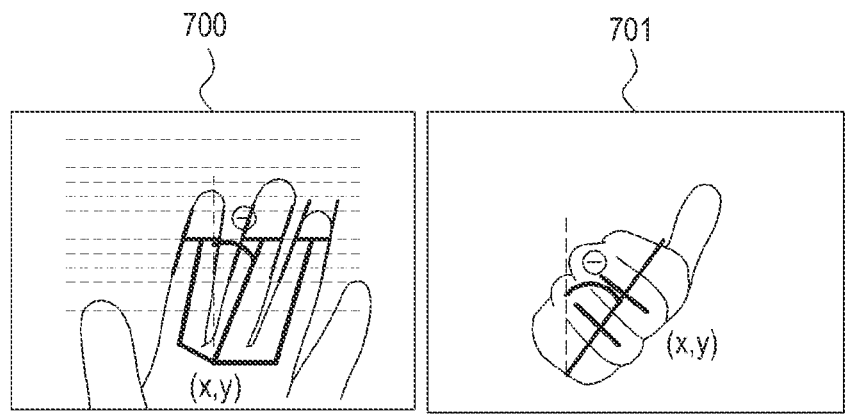
FIG. 7 illustrates an example of a process of further recognizing a direction of a hand shape according to an embodiment of the present invention.

FIG. 7 illustrates an example of a process of further recognizing a direction of a hand shape according to an embodiment of the present invention.

For example, even when a hand tilts so that the palm of the hand leans in a rightward direction as illustrated by reference numeral 700, the hand shape is recognized through the same process as that performed in the first embodiment of the present invention. However, since the hand and palm tilt in the rightward direction, there a slope difference between a vertical pixel line generated in a vertical line from a pixel line where no edge is detected to finger feature data and a vertical direction line on the image. At this time, the controller 10 recognizes a rotation of the hand together with the hand shape by calculating the slope difference through comparison between a slope of the generated vertical pixel line and a slope of the vertical direction line on the image.

As another example, even when the hand shape achieved by a closed fist held with a thumb extended upward tilts in a right direction, as illustrated by reference numeral 701, the hand shape is recognized in the same way as that performed in the third embodiment of the present invention. However, since the hand shape tilts in the right direction, there is a slope difference between the finger feature data and the vertical direction line on the image. At this time, the controller 10 recognizes a rotation of the hand together with the hand shape by calculating the slope difference through comparison between a slope of the finger feature data and a slope of the vertical direction line on the image. That is, when the slope difference value is larger than the present threshold, it can be determined that the hand is rotated.

The present invention has advantages in that the throughput of data used to recognize a hand shape can be reduced and the hand shape can be quickly recognized by calculating edges for each pixel line of the image, detecting finger feature data by using a preset feature reference value, and outputting a hand shape recognition result by using a finger candidate pattern detected using the detected finger feature data.

It may be appreciated that the embodiments of the present invention can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention. Therefore, embodiments of the present invention provide a program including codes for implementing a system or method claimed in any claim of the accompanying claims and a machine-readable device for storing such a program. Further, this program may be electronically conveyed through any medium such as a communication signal transferred via a wired or wireless connection, and embodiments of the present invention appropriately include equivalents thereto.

Further, the hand shape recognition apparatus can receive the program from a program providing apparatus connected to the hand shape recognition apparatus wirelessly or through a wire and store the received program. The program providing apparatus may include a memory for storing a program containing instructions for allowing the hand shape recognition apparatus to perform a preset content protecting method and information required for the content protecting method, a communication unit for performing wired or wireless communication with the hand shape recognition apparatus, and a controller for transmitting the corresponding program to the hand shape recognition apparatus according to a request of the hand shape recognition apparatus or automatically.

While the present invention has been particularly shown and described with reference to certain embodiments thereof, it will be understood by those of ordinary skill in the art that various changes in form and details may be made therein without departing from the spirit and scope of the present invention as defined by the following claims.

What is claimed is:

1. An apparatus for recognizing a hand shape by using a finger pattern, the apparatus comprising:
   a memory configured to store one or more preset finger patterns according to one or more hand shapes;
   a camera configured to receive an optical signal and output an image;
   a controller configured to calculate edges for each pixel line within the output image, detect finger feature data according to a preset feature reference value by using the calculated edges, determine a first pixel line where no edge is detected within an area having a preset size based on the detected finger feature data, generate a second pixel line extending in a vertical direction from the determined first pixel line to the finger feature data, detect a candidate finger pattern by using the detected finger feature data and the second pixel line, and detect a preset finger pattern that matches the candidate finger pattern from the stored one or more preset finger patterns; and
   a display configured to display a hand shape corresponding to the preset finger pattern.

2. The apparatus of claim 1, wherein the preset feature reference value includes at least one of a length of a pixel group between the calculated edges, an average pixel value of the pixel group, a ratio of lengths between adjacent pixel groups, and a direction of the calculated edges.

3. The apparatus of claim 2, wherein the controller detects pixel groups having similar lengths and similar average pixel values among pixel groups between the calculated edges as the finger feature data.

4. The apparatus of claim 2, wherein the controller detects the adjacent pixel groups having a ratio of lengths equal to a preset threshold ratio.

5. The apparatus of claim 2, wherein the controller determines pixel groups having similar lengths, similar average pixel values, and the same direction of the calculated edges among the pixel groups between the calculated edges as the finger feature data.

6. The apparatus of claim 1, wherein, when there is a slope difference between a direction of the detected finger feature data and a vertical direction of the image by comparing the direction of the detected finger feature data with the vertical direction of the image, the controller determines that a hand shape is rotated.

7. A method of recognizing a hand shape by using a finger pattern in a hand shape recognition apparatus, the method comprising:
   storing one or more preset finger patterns according to one or more hand shapes;
   receiving, by a camera, an optical signal;
   outputting, by the camera, an image;
   calculating, by a controller, edges for respective pixel lines within the output image;
   detecting, by the controller, finger feature data according to a preset feature reference value by using the calculated edges;
   determining, by the controller, a first pixel line where no edge is detected within an area having a preset size based on the detected finger feature data;
   generating, by the controller, a second pixel line extending in a vertical direction from the first determined pixel line to the finger feature data;
   detecting, by the controller, a candidate finger pattern by using the detected finger feature data and the second pixel line;
   detecting a preset finger pattern that matches the candidate finger pattern from the stored one or more preset finger patterns; and
   displaying, by a display, a hand shape corresponding to the preset finger pattern.

8. The method of claim 7, wherein the preset feature reference value includes at least one of a length of a pixel group between the calculated edges, an average pixel value of the pixel group, a ratio of lengths between adjacent pixel groups, and a direction of the calculated edges.

9. The method of claim 8, wherein detecting the finger feature data comprises detecting pixel groups having similar lengths and similar average pixel values among pixel groups between the calculated edges as the finger feature data.

10. The method of claim 8, wherein detecting the finger feature data comprises detecting the adjacent pixel groups having a ratio of lengths equal to a preset threshold ratio.

11. The method of claim 8, wherein detecting the finger feature data comprises determining pixel groups having similar lengths, similar average pixel values, and an equal direction of the calculated edges among the pixel groups between the calculated edges as the finger feature data.

12. The method of claim 7, further comprising:
- comparing a direction of the detected finger feature data with a vertical direction of the image; and
- when there is a slope difference between the direction of the detected finger feature data and the vertical direction of the image, determining that a hand shape is rotated.

\* \* \* \* \*